Feb. 1, 1966    C. W. GILBERT    3,233,158
SYSTEM FOR CONTROLLING ALTERNATING CURRENT MOTORS
Filed July 26, 1962
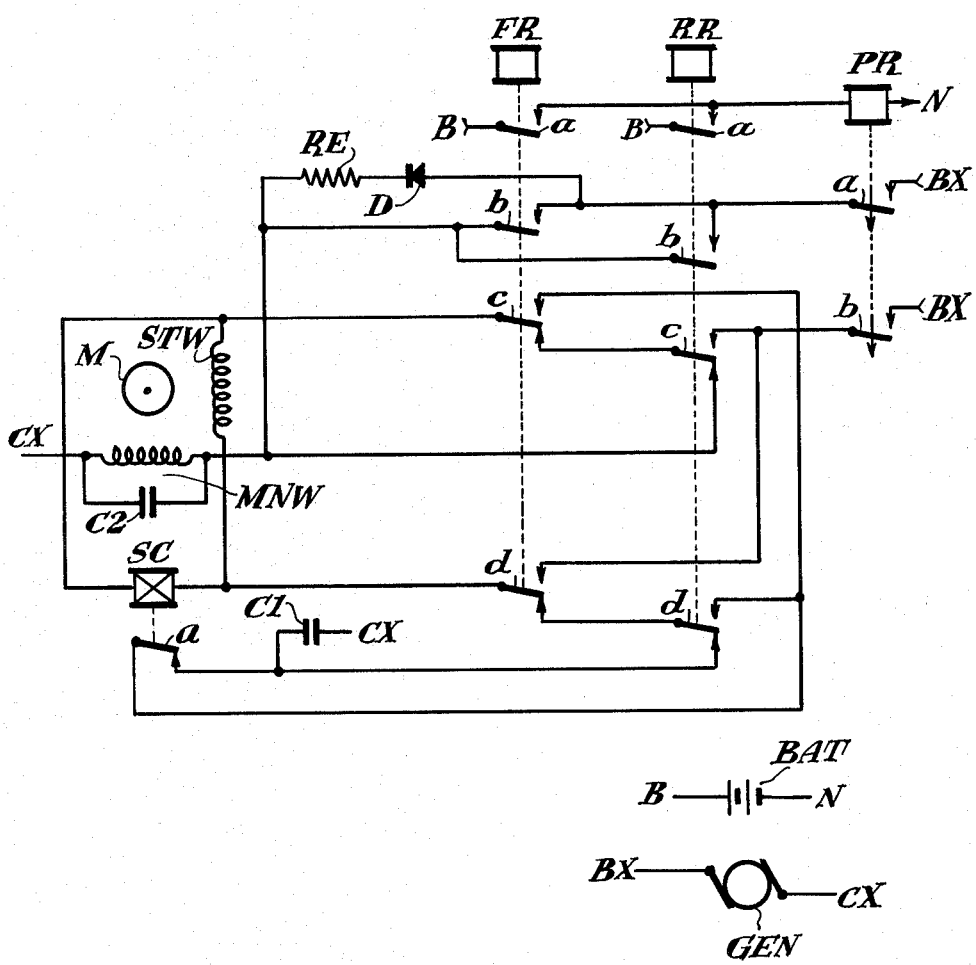
INVENTOR.
Chalmers W. Gilbert.
BY W. L. Stout.
HIS ATTORNEY

3,233,158
SYSTEM FOR CONTROLLING ALTERNATING CURRENT MOTORS
Chalmers W. Gilbert, Penn Hills Township, Allegheny County, Pa., assignor to Westinghouse Air Brake Company, Wilmerding, Pa., a corporation of Pennsylvania
Filed July 26, 1962, Ser. No. 212,583
3 Claims. (Cl. 318—212)

My invention pertains to a system for controlling alternating current motors. More particularly my invention pertains to a system for braking an alternating current induction motor by the use of half waves of the alternating current normally employed for driving the motor, that is, by the use of half-wave rectified alternating current.

In many systems employing electric motor driven apparatus it is important, following the cut-off of power to the motor, to minimize the drift of the motor and its associated apparatus. In the past the minimization of such drift has been obtained by the use of electrically operated friction brakes or by the use of dynamic braking. Some capacitor start motors are provided with a form of dynamic braking by connecting the main and starting windings of the motor in parallel through a back contact of the starting relay since such contact releases as the motor slows down. However, such braking systems are not entirely satisfactory since the effect of friction brakes varies according to wear and, therefore, this type of brakes requires substantial maintenance, and a dynamic braking system such as that outlined is subject to variance in braking due to delay in establishing the connections between the main and starting windings of the motor.

It is accordingly one object of my invention to provide a new and novel form of braking system for an alternating current induction motor.

It is another object of my invention to provide a braking system for an alternating current induction motor which is more effective and requires less maintenance than the braking systems heretofore employed.

In accomplishing the above objects of my invention, I provide a slow release relay in conjunction with a diode or half-wave rectifier and, following the cut-off to the motor of the alternating current employed to drive the motor, I employ such rectifier and front contact of said relay to supply half waves of said alternating current to the windings of the motor.

Other objects and characteristic features of my invention will become apparent as the description proceeds.

I will describe one form of apparatus embodying my invention and will then point out the novel features thereof in claims.

The single accompanying drawing comprises a schematic diagram of the motor control and braking system according to my invention.

Referring to the drawing, there is shown in the upper right hand part thereof a group of first, second and third relays designated FR, RR and PR, respectively. These relays are direct current relays of the neutral two-position type well known in the art and each is shown in the conventional manner by a geometric rectangle representing the winding of the relay. The contacts controlled by each relay are disposed on the drawing directly below the rectangle representing the winding of the respective relay. Relay PR is a slow release relay as indicated by the arrow drawn in the downward direction through the movable portion of the contacts of the relay, that is, in the direction in which the relay is slow acting. Relay FR is a forward motor control relay and relay RR is a reverse motor control relay. The control circuits for these relays are not shown in the drawings as such circuits form no part of my invention, but it is to be understood that relays FR and RR become picked up at separate times to control circuits to be hereinafter described. Relay PR is a repeater relay which repeats the operation of front contacts of relays FR and RR as will become apparent hereinafter.

It should be pointed out at this time that a battery designated BAT and a generator designated GEN are shown in the lower right hand part of the drawing. This battery and generator provide the direct current and alternating current, respectively, required for the operation of the apparatus shown. The positive and negative terminals of battery BAT are designated B and N, respectively, and the terminals of generator GEN are designated by the reference characters BX and CX.

As previously mentioned relay PR is controlled by relays FR and RR, and has a control circuit which extends from terminal B of battery BAT over front contacts $a$ of relays FR and PR in multiple and thence through the winding of relay PR to battery terminal N. It is apparent that relay PR becomes picked up over said control circuit whenever relay FR or relay RR becomes picked up, and remains picked up, following the opening of its control circuit, until the expiration of its slow release period. The purpose of slow release repeater relay PR will become apparent as the description proceeds.

There is shown at the left hand side of the drawing a reversible motor M of the single phase induction type having a start winding STW and a main winding MNW. A suitable phase shifting device shown as a capacitor C1 is employed, as hereinafter described, in conjunction with the start winding STW of motor M. A second capacitor C2 is connected across the main winding MNW of motor M for the purpose hereinafter discussed. There is connected in multiple with starting winding STW a starting relay SC shown by a geometric rectangle representing the winding of the relay and having lines diagonally drawn therethrough to indicate that it is an alternating current relay. When the speed of the rotor of motor M is sufficiently high, a voltage of sufficient magnitude to cause the pickup of relay SC is induced in the starting winding STW. Accordingly at such time relay SC becomes picked up and opens its back contact $a$, such contact being shown beneath the rectangle representing the winding of the relay. Such relays and their operation are well known in the art. The circuit controlled by such back contact of relay SC will be discussed hereinafter.

There is also shown in the drawing a resistor RE which is connected in series with a half-wave rectifier or diode D and the winding MNW of motor M. The purpose of this apparatus will become apparent as the description proceeds.

The main winding MNW of motor M has a first energizing circuit extending from terminal BX of generator GEN over front contact $a$ of relay PR, front contacts $b$ of relays FR and RR in multiple and through winding MNW to terminal CX of generator GEN. Thus the main or running winding of motor M is energized by alternating current whenever relay FR or relay RR, and repeater relay PR are picked up.

The starting winding STW of motor M has a first energizing circuit extending from terminal BX of generator GEN over front contact $b$ of relay PR, the front point of contact $c$ of relay RR, the back point of contact $c$ of relay FR, motor starting winding STW, the back point of contact $d$ of relay FR, the front point of contact $d$ of relay RR, back contact $a$ of relay SC and thence through phase shifting capacitor C1 to terminal CX of generator GEN. Winding STW has a second energizing circuit extending from terminal BX of the alternating current source GEN over front contact *b* of relay PR, the front point of contact *d* of relay FR, winding STW, the front point of contact *c* of relay FR, back contact *a* of relay SC and thence through phase shifting capacitor C1 to terminal CX of the alternating current source GEN. Thus, winding STW of motor M is supplied with alternating current of first and second opposite phases when relays FR and RR, respectively, are picked up.

As is well known, the rotor of a single phase induction motor may be caused to rotate in a first (forward) direction or in a second (reverse) direction in accordance with the phase of the current supplied to the starting winding of the motor in relation to the phase of the current supplied to the main or running winding of the motor.

If, then, alternating current of a particular phase is supplied to the main winding of the motor and alternating current of the same phase is supplied to the starting winding and associated capacitor C1 of the motor, the motor rotor will rotate in a first direction. If the phase of the current supplied to the starting winding and the capacitor is reversed, the motor rotor will rotate in a second direction opposite to the first direction. After the starting winding is deenergized by the opening of the starting relay contact, the motor rotor continues to rotate in the direction in which it was started so long as alternating current is supplied to the main winding of the motor.

Referring further to the drawing it will be seen that winding MNW of motor M has a second energizing circuit extending from terminal BX of the alternating current source over front contact *a* of relay PR, diode D, resistor RE and thence through winding MNW to terminal CX of the alternating current source. It is thus apparent that winding MNW is supplied with half-wave rectified alternating current whenever slow release relay PR remains picked up following the release of relay FR or relay RR after a period of energization of one of such relays.

Winding STW has a third energizing circuit which extends from terminal BX of the alternating current source over front contact *a* of relay PR, diode D, resistor RE, the back point of contact *c* of relay RR, the back point of contact *c* of relay FR, winding STW, the back point of contact *d* of relay FR, the back point of contact *d* of relay RR, and through capacitor C1 to terminal CX of the alternating current source. It is thus apparent that winding STW is supplied with half-wave rectified alternating current whenever winding MNW is supplied with such current.

As an example of the operation of the apparatus of my invention it will be assumed that relay FR becomes picked up to supply energy to the windings of motor M to drive the rotor of the motor in a first or forward direction. Relay PR also becomes picked up over the control circuit including front contact *a* of relay FR and completes the previously traced first energizing circuit to winding MNW of motor M and the previously traced second energizing circuit to winding STW of motor M. Accordingly the rotor of motor M is started in its forward direction. When the rotor of the motor is rotating at a sufficiently high speed, sufficient energy is induced in winding STW of the motor to cause relay SC to become picked up and open its back contact *a*. Upon the opening of such back contact, the supply of energy to winding STW is interrupted and the rotor of the motor continues to be driven by the energy supplied to the main winding MNW only of the motor.

When relay FR is thereafter released to interrupt the supply of energy to winding MNW and stop the motor, relay PR remains picked up for the period of time provided by its slow release feature. During such period of time the second and third previously discussed energizing circuits for windings MNW and STW, respectively, supply half waves of alternating current from the alternating current source to said windings through diode D and resistor RE. This half-wave rectified current will, due to the interaction of the fields of the windings at such time, produce a braking torque on the rotor of motor M to bring the rotor to a quick stop.

By the above description it will be readily apparent that the system also operates in a similar manner to brake the rotor of motor M following a period of energization of relay RR and the rotation of the rotor in its second or reverse direction. It will also be readily understood that the braking system of my invention could as well be employed with a control system for driving a motor in one direction only, and that I have chosen to illustrate such braking system with a reversible motor control system only for purposes of description of the invention. As previously mentioned, the specific circuits for controlling relays FR and RR form no part of my present invention but these relays may, for example, be controlled in a manner similar to relays MOR and MCR, respectively, shown in copending application Serial No. 96,942, filed March 20, 1961, now Pat. No. 3,150,454 by Crawford E. Staples for Barrier Control System and assigned to the same assignee as my present application.

It should also be pointed out that in the event of the failure of the alternating current power supply from generator GEN, windings MNW and STW are connected in series over an obvious circuit including capacitor C1 and the back points of contacts *c* and *d* of relays FR and RR. Such circuit provides dynamic braking of the rotor of motor M. Although this form of braking is not as effective as the half-wave alternating current braking provided by the system of my invention, such dynamic braking does provide, to some extent, for retardation of the motor rotor in the event of failure of the alternating current power supply.

Apparatus such as herein disclosed is relatively simple and reliable, and provides a more economical motor braking system than the friction type brakes heretofore employed and a more positive and consistent electrical braking system than the dynamic systems oftentimes previously used.

Although I have herein shown and described only one form of apparatus embodying my invention, it will be understood that various changes and modifications may be made therein within the scope of the appended claims without departing from the spirit and scope of my invention.

Having thus described my invention, what I claim is:

1. A control system for a single phase induction motor having a main winding, a starting winding, and a normally closed contact actuated to an open position when the rotor of the motor exceeds a predetermined speed, said system comprising, in combination:
   (a) a relay,
   (b) a capacitor,
   (c) a source of alternating current,
   (d) means responsive to the energization of said relay for supplying alternating current from said source to said main winding,
   (e) means responsive to the energization of said relay for supplying alternating current from said source to said starting winding over said normally closed contact and through said capacitor,
   (f) a diode; and
   (g) means, including said diode and responsive to the deenergization of said relay following a period of energization thereof, for supplying from said source half-wave rectified current to said starting winding through said capacitor and simultaneously to said main winding.

2. A control system for a single phase induction motor having a main winding, a starting winding, and a normally closed contact actuated to an open position when the rotor of the motor exceeds a predetermined speed, said system comprising, in combination:
(a) a first relay,
(b) a slow release front contact repeater relay of said first relay,
(c) a capacitor,
(d) an alternating current source,
(e) a first series circuit including front contacts of said first and said repeater relays for supplying alternating current from said source to the main winding of said motor;
(f) a second series circuit including a front contact of said first relay, a front contact of said repeater relay, said normally closed contact, and said capacitor for supplying alternating current from said source to the starting winding of said motor;
(g) a half-wave rectifier,
(h) a third series circuit including a first contact of said repeater relay and said rectifier for supplying half-wave rectified current from said source to said main winding; and
(i) a fourth series circuit including the last mentioned circuit, a back contact of said first relay, and said capacitor for supplying half-wave rectified current from said source to said starting winding.

3. A control system for a single phase induction motor having a main winding, a starting winding, and a normally closed contact actuated to an open position when the rotor of the motor exceeds a predetermined speed, said system comprising, in combination:
(a) a first relay,
(b) a second relay,
(c) a slow release front contact repeater relay of both said first and second relays,
(d) a source of alternating current,
(e) first circuit means including front contacts of said first relay and said repeater relay for energizing the windings of said motor with alternating current from said source to start the motor and drive the motor in a first direction,
(f) second circuit means including front contacts of said second relay and said repeater relay for energizing the windings of said motor with alternating current from said source to start the motor and drive the motor in a second direction opposite to said first direction,
(g) a diode,
(h) third circuit means including said diode and a front contact of said repeater relay for supplying half-wave rectified current from said source to the main winding of said motor upon the deenergization of said first or said second relay following a period of energization of such relay; and
(i) fourth circuit means including said diode, a front contact of said repeater relay, and back contacts of said first and second relays for supplying half-wave rectified current from said source to the starting winding of said motor upon the deenergization of said first or said second relay following a period of energization of such relay.

References Cited by the Examiner
UNITED STATES PATENTS
2,637,007 4/1953 Picking _____ 318—212
2,922,097 1/1960 Choudhury _____ 318—212

OTHER REFERENCES
German printed application 1,006,939, Heiligenhaus, KL.21c 59/58, April 25, 1957.

ORIS L. RADER, *Primary Examiner.*